WILLIAM R. FAIRBAIRN, OF RIDOTTE TOWNSHIP, ILLINOIS.

Letters Patent No. 84,867, dated December 15, 1868.

IMPROVED COMPOUND FOR DESTROYING INSECTS.

The Schedule referred to in these Letters Patent and making part of the same.

*To all whom it may concern:*

Be it known that I, WILLIAM R. FAIRBAIRN, of Ridotte township, in the county of Stephenson, and State of Illinois, have invented a new and useful Compound for Killing Insects on trees; and I do hereby declare that the following is a full and exact description of the same, reference being had to the accompanying drawings, and to the letters of reference marked thereon.

This invention consists of a compound, to be herein more fully described, for the purpose of destroying bark-lice or other insects upon apple and other trees.

I prepare my compound in the following manner, and of given substances and proportions:

Of stone sulphur, ground, I take three (3) parts; black sulphide of mercury, three (3) parts; red precipitate, two (2) parts; French green paint, three (3) parts; and of quicksilver, three (3) parts.

These ingredients I thoroughly mix, and prepare either in solid or liquid form. The compound may be applied, either at the root or commencement of branches, by making an incision into the bark, and introducing the mixture between the bark and the tree. The incision should then be hermetically sealed.

Having thus fully described my invention,

What I claim, and desire to secure by Letters Patent of the United States, is—

The described compound, of the ingredients and proportions specified, and for the purpose set forth.

This specification signed and witnessed, this 14th day of July, 1868.

W. R. FAIRBAIRN.

Witnesses:
    MARTIN KRINBILL,
    SMITH D. ATKINS.